(12) United States Patent
Taylor et al.

(10) Patent No.: US 11,136,054 B1
(45) Date of Patent: Oct. 5, 2021

(54) LEVER ASSIST FOR TRANSPORT DOLLY

(71) Applicants: Nick Taylor, Stafford, VA (US); James P. McShane, Erie, PA (US)

(72) Inventors: Nick Taylor, Stafford, VA (US); James P. McShane, Erie, PA (US)

( * ) Notice: Subject to any disclaimer, the term of this patent is extended or adjusted under 35 U.S.C. 154(b) by 157 days.

(21) Appl. No.: 15/974,365

(22) Filed: May 8, 2018

(51) Int. Cl.
*B62B 1/14* (2006.01)

(52) U.S. Cl.
CPC ............ *B62B 1/14* (2013.01); *B62B 2203/10* (2013.01)

(58) Field of Classification Search
CPC ............................. B62B 1/14; B62B 2203/10
See application file for complete search history.

(56) References Cited

U.S. PATENT DOCUMENTS

| | | | | |
|---|---|---|---|---|
| 3,035,727 A * | 5/1962 | Turner | ...................... | B62B 1/14 414/444 |
| 3,072,437 A * | 1/1963 | Shea | ...................... | A61G 5/128 297/423.32 |
| 6,237,925 B1 * | 5/2001 | Koenig | ...................... | B62B 1/12 280/47.28 |
| 6,273,438 B1 * | 8/2001 | Prapavat | ................. | B62B 1/002 280/47.2 |
| 6,457,727 B1 * | 10/2002 | Tolly | ........................ | B62B 1/14 280/47.19 |
| 6,648,354 B2 * | 11/2003 | James | .................... | A61G 5/023 280/250.1 |
| 8,136,822 B2 * | 3/2012 | Harrison | ................... | B62B 1/14 280/47.17 |
| 8,235,401 B1 * | 8/2012 | Scriven | ..................... | B62B 1/12 280/47.17 |
| 10,214,227 B1 * | 2/2019 | Taylor | .................... | B62B 5/0026 |
| 2003/0173753 A1 * | 9/2003 | Pong | ........................ | B62B 1/12 280/47.27 |
| 2007/0080512 A1 * | 4/2007 | Bartholmey | ............. | B62B 1/26 280/47.24 |
| 2009/0160148 A1 * | 6/2009 | Francis | ..................... | B62B 1/14 280/47.23 |
| 2010/0327544 A1 * | 12/2010 | Pebworth | ................. | B62B 1/14 280/6.151 |
| 2011/0221146 A1 * | 9/2011 | Leung | ....................... | B62B 1/12 280/47.17 |
| 2011/0318149 A1 * | 12/2011 | Barnes | .................... | B62B 1/142 414/469 |
| 2012/0141238 A1 * | 6/2012 | McFarland | ............... | B62B 1/14 414/444 |
| 2012/0242063 A1 * | 9/2012 | Bruckner | ................ | B62B 1/002 280/651 |
| 2013/0069324 A1 * | 3/2013 | Weibel | .................... | B62B 5/026 280/47.26 |

(Continued)

*Primary Examiner* — Saul Rodriguez
*Assistant Examiner* — Ashley K Romano
(74) *Attorney, Agent, or Firm* — Richard K Thomson

(57) ABSTRACT

A foot lever assist mechanism permits transport dollies to be more heavily loaded, saving the worker additional trips to deliver the entire supply. The lever assist is preferably secured to the axle using at least one boss. An auxiliary feature of this lever assist is the provision of a telescoping ladder-like extender for supporting beverage kegs. A toe grab allows the workman to tilt the stack of cases off of the hand truck's support platform and pull the bottom of the hand truck from beneath the load. Brakes are also provided to resist the hand truck's tendency to move rearwardly when tilting is attempted.

15 Claims, 13 Drawing Sheets

(56) References Cited

U.S. PATENT DOCUMENTS

| | | | | |
|---|---|---|---|---|
| 2013/0094928 A1* | 4/2013 | McFarland | ............... | B62B 1/12 |
| | | | | 414/457 |
| 2014/0145131 A1* | 5/2014 | Cozza | ...................... | B62B 1/26 |
| | | | | 254/7 R |
| 2014/0159328 A1* | 6/2014 | Bowden | .................... | B62B 1/12 |
| | | | | 280/47.27 |
| 2014/0319438 A1* | 10/2014 | Carlson | .................... | B62B 3/02 |
| | | | | 254/2 R |
| 2014/0333041 A1* | 11/2014 | Mojeski | .................... | B62B 3/10 |
| | | | | 280/79.2 |
| 2015/0028554 A1* | 1/2015 | Schneider | ................. | B62B 1/14 |
| | | | | 280/47.26 |
| 2015/0353112 A1* | 12/2015 | Nikora | ................... | B65G 65/24 |
| | | | | 280/47.24 |
| 2016/0023349 A1* | 1/2016 | Hoppe | ................. | A45C 7/0045 |
| | | | | 280/655.1 |
| 2016/0096541 A1* | 4/2016 | Smith | ....................... | B62B 1/26 |
| | | | | 248/201 |
| 2017/0210406 A1* | 7/2017 | Biesinger | ................ | B62B 1/125 |
| 2017/0293294 A1* | 10/2017 | Atchley | ................ | B62B 5/0069 |
| 2018/0127011 A1* | 5/2018 | Cai | ............................ | B62B 5/02 |
| 2018/0251143 A1* | 9/2018 | Benton | .................... | B62B 1/14 |
| 2018/0319212 A1* | 11/2018 | Lindgren | ................ | B60B 29/001 |
| 2019/0126962 A1* | 5/2019 | Brooks | .................... | B62B 1/06 |
| 2019/0256119 A1* | 8/2019 | Brilhante | .............. | B62B 5/0495 |

* cited by examiner

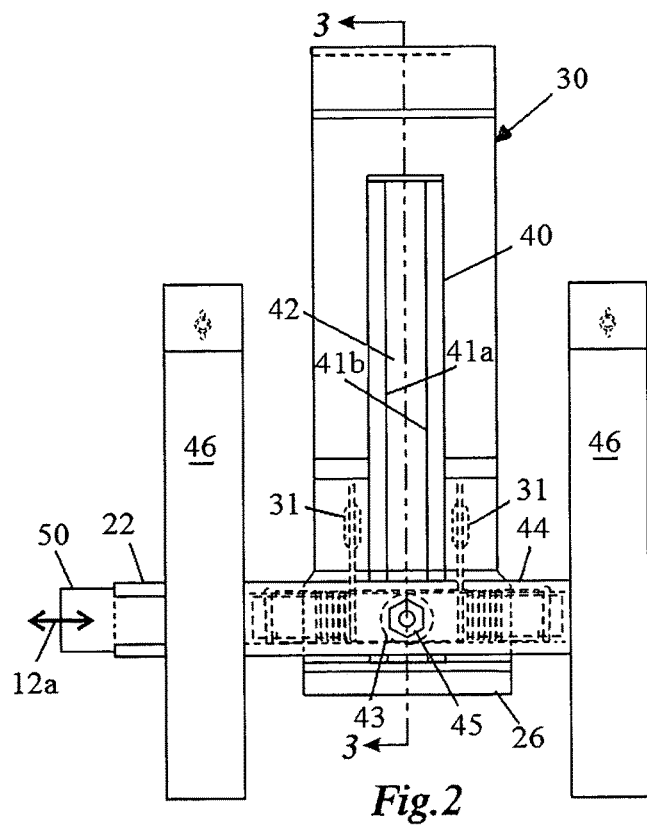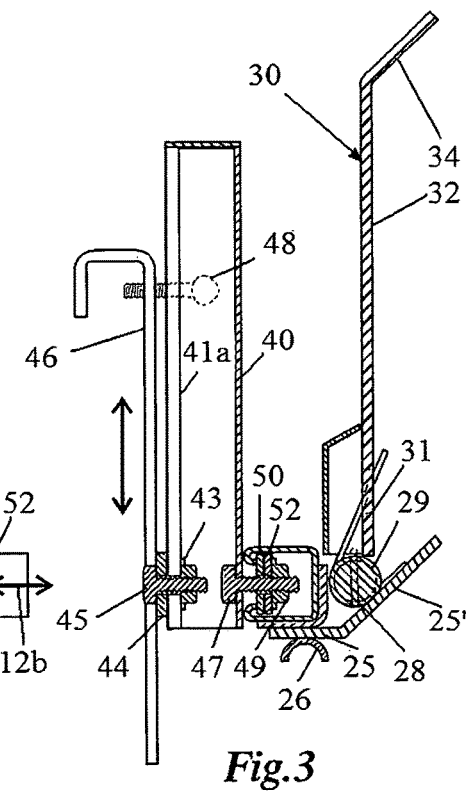
*Fig.2*  *Fig.3*
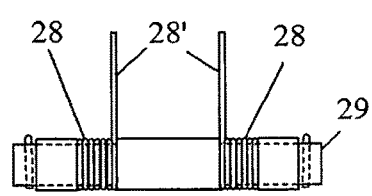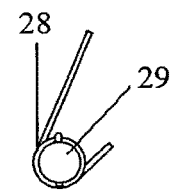
*Fig.4A*  *Fig.4B*

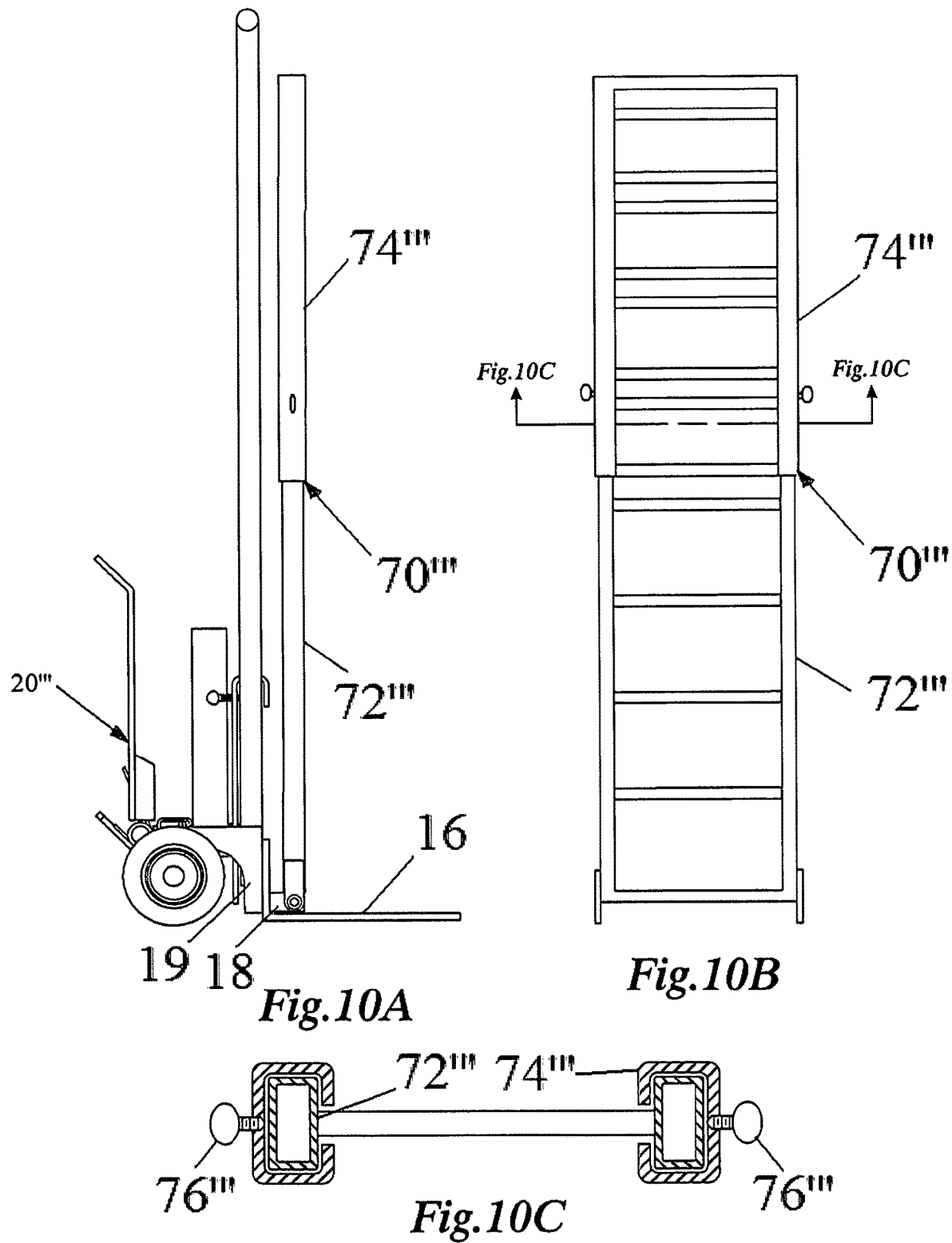

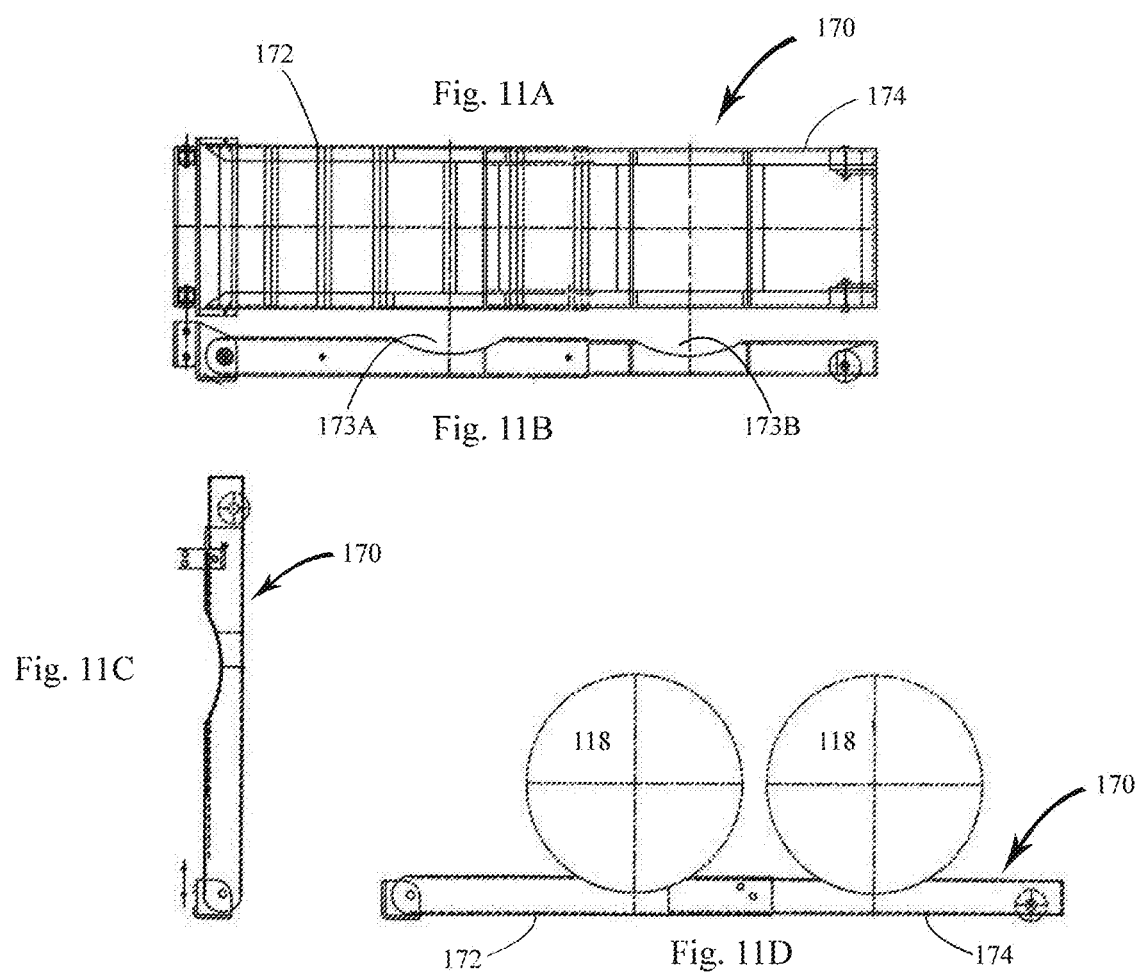

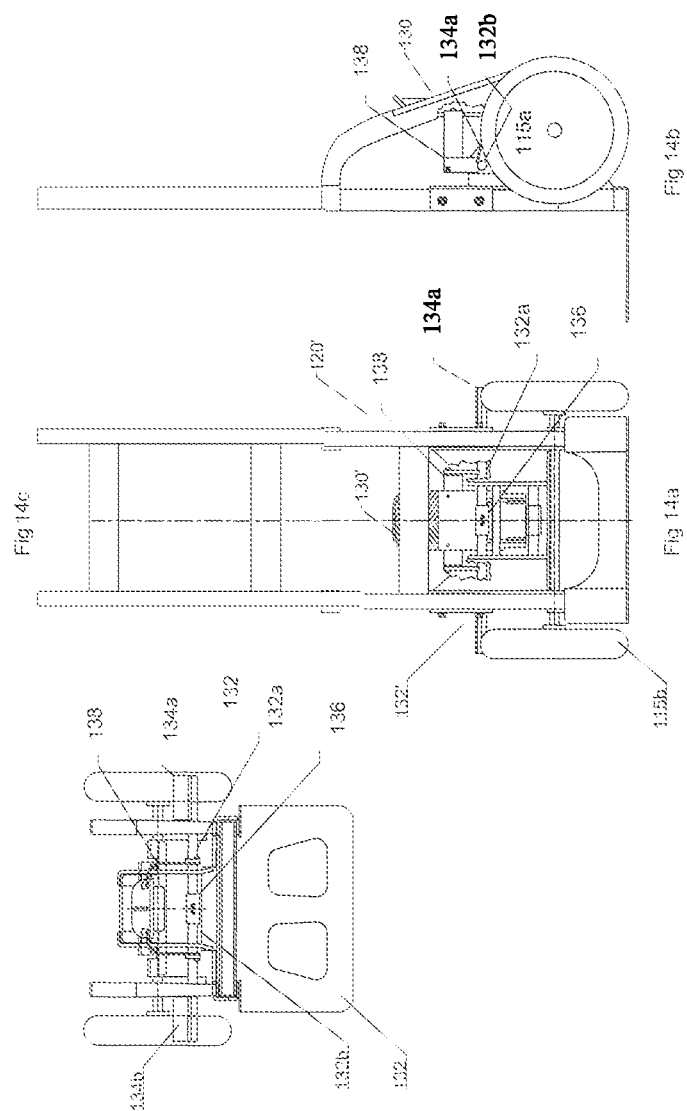

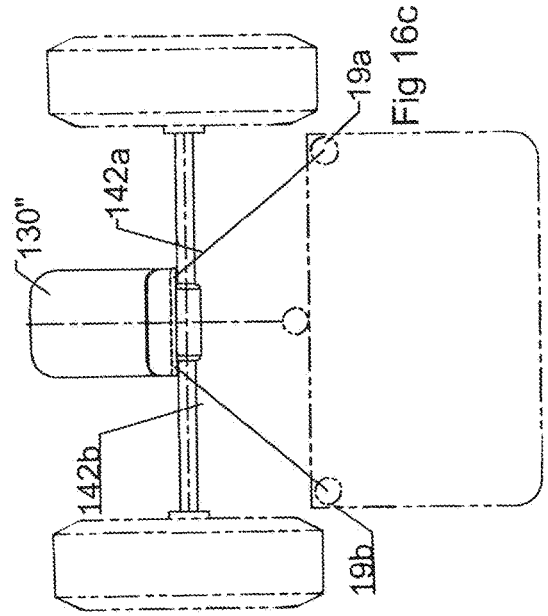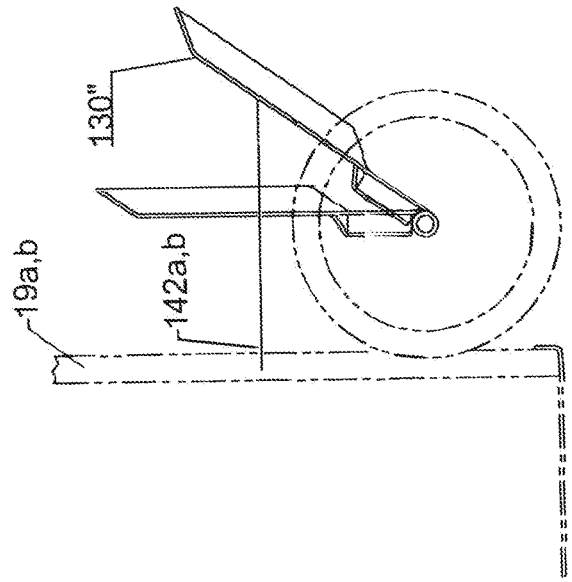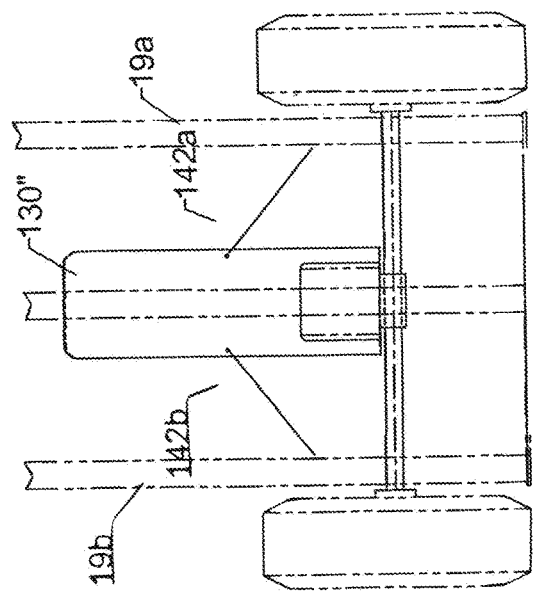

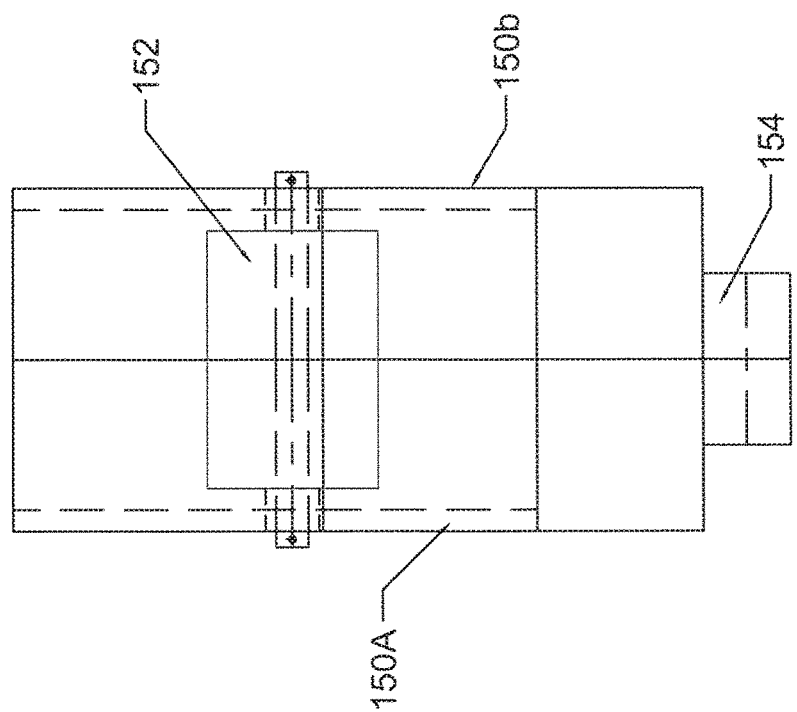
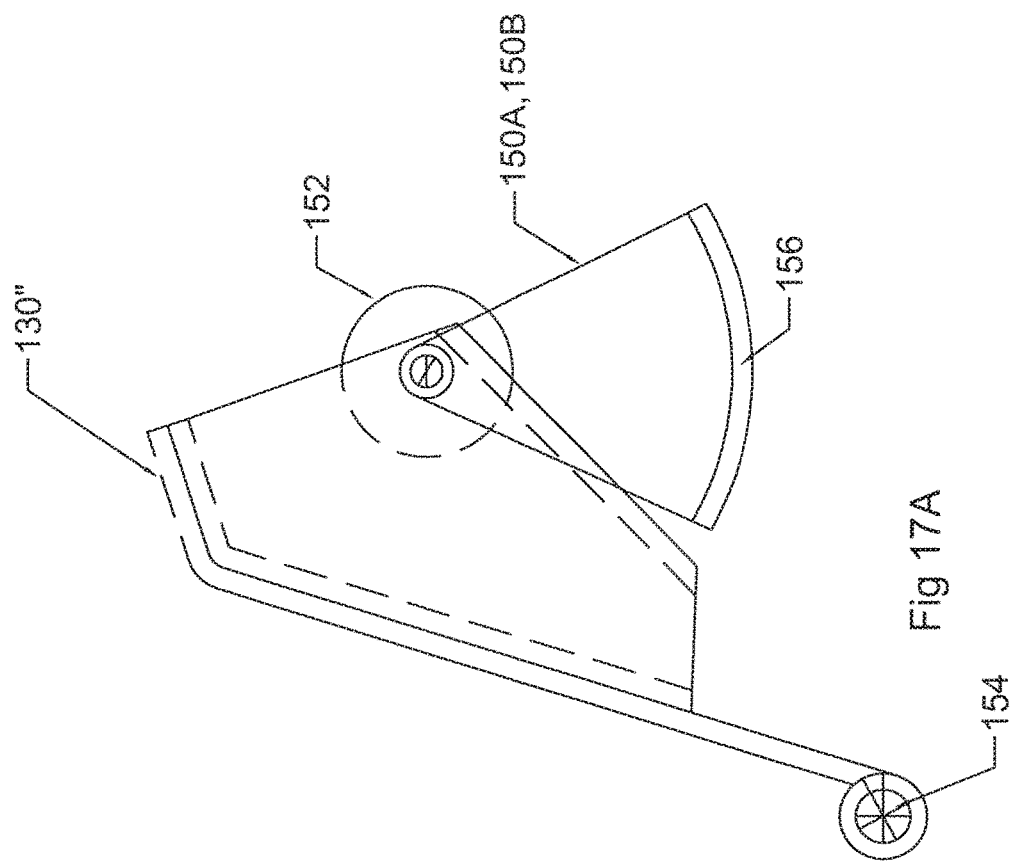

LEVER ASSIST FOR TRANSPORT DOLLY

This application is a continuation-in-part of U.S. patent application Ser. No. 15/672,890 filed Aug. 7, 2017 and claims priority from provisional patent appl. No. 62/653,686 filed Apr. 6, 2018, both of which are hereby incorporated by reference.

BACKGROUND AND SUMMARY OF THE INVENTION

The present invention is directed to the field of transport dollies. More particularly, the present invention is directed to a foot lever to assist transport dolly manipulation, particularly when heavily loaded.

Transport dolly operators such as the drivers of beer, soda, and water delivery trucks, get paid either by the hour or based on the number of deliveries made in a day. Accordingly, the dolly operators would like to make as few trips as possible to off-load the products at a particular stop. Hence, if at all possible, it would be beneficial to stack the entire delivery on the dolly and make a single visit into the commercial establishment. The major impediment to achieving this objective is the initial "rock back" movement needed to enable the load to be balanced on the wheels of the dolly. Once this impediment has been overcome, the large dolly load can be readily maneuvered or "horsed" into the store by virtue of the mechanical advantage afforded by the wheels.

Applicant's earlier invention disclosed and claimed in U.S. Pat. No. 8,235,401 entitled "Lever Assist for a Transport Dolly" is significantly advantageous in achieving this objective for the specialized transport dolly for outboard motors for which it was designed. As noted therein "Clever Lever I" enables a petite 120 woman to move a 350 lb motor from point A to point B. However, even if the "Clever Foot Lever I" was re-designed to adapt to a conventional dolly, for a large beverage distributor or furniture mover, the prospect of scrapping their existing inventory of dollies in order to overcome the hurdles associated with those dollies is considered by many, to be cost-prohibitive.

Accordingly, it is among the objects of the present invention to provide a separate lever assist device capable of being attached to a dolly for a day, month, or life of the dolly and/or moved between a first dolly and a second without the need to replace the dolly. A second embodiment provides a permanently attached lever assist that is superior to similar existing devices. Lastly, a ladder-like extension and extended base plate, which can optionally be provided with an adjustable extension feature, enables the dolly to be loaded beyond anything currently capable with a standard angled base support. As an additional enhancement, the ladder-like member may be coated with pink to promote breast cancer awareness. Due to the difficulty of the "tilt-back" problem, the beverage delivery business is dominated by men. The addition of the "Clever Foot Lever" of the present invention to dollies creates an equalizer that makes delivery truck jobs a whole new ball game for women.

A first feature of the present invention is a foot-operated lever assist mechanism for use on a dolly which has a laterally extending axle mounting a plurality of wheels, the mechanism comprising: a) a laterally extending channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) means to secure the foot-operated lever assist mechanism to a dolly, the means to secure including means to engage the laterally extending axle of the dolly. The means to engage the laterally extending axle can comprise an arcuate member which sits atop the axle. One means to engage the laterally extending axle may comprise a series of welds which secures the lever assist mechanism to the dolly.

Alternatively, the foot-operated lever assist mechanism may include a vertical post secured to the longitudinal channel member, the vertical post being adjustably secured to the laterally extending channel member. A pair of hangar arms are attached to the vertical post, the pair of hangars forming the means to secure the foot-operated lever to the dolly. An additional feature of the lever assist mechanism may include an extension member pivotally connected to a horizontally extending portion of the dolly. The extension member may consist of a telescopic mechanism allowing a length of the extension member to be adjusted.

A second feature of the present invention comprises a foot-operated lever assist mechanism for use on a dolly which has a horizontal axle mounting a plurality of wheels, said mechanism including: a) a longitudinal channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) a vertical post secured to the longitudinal channel member; f) a pair of hangar arms attached to the vertical post, the pair of hangars forming means to removably secure the foot-operated lever to the dolly allowing the foot-operated lever assist mechanism to be moved from one dolly to another. Each of the pair of hangar arms has a thumb screw threadably attached thereto allowing it to be secured to a horizontal support on the dolly.

A third feature of the present invention comprises a foot-operated lever assist mechanism for use on a hand truck or dolly which has a horizontal axle mounting a plurality of wheels, the mechanism including: a) a longitudinal channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) an extension member pivotally connected to a horizontally extending portion of the dolly movable from a vertical, collapsed idle position to a horizontally extended loadable position. The extension member includes a first element pivotally attached to a horizontally extending portion of the dolly and a second member telescopically engaging said first member. A securing means is included to fix the second member with respect to the first member. The foot-operated lever assist mechanism includes a camming member attached to said foot-operated lever assist mechanism facilitating climbing steps with a fully loaded hand truck.

A fourth feature comprises a foot-operated lever assist mechanism for use on a dolly which has a laterally extending axle mounting a plurality of wheels, where the mechanism includes a) a pivotable foot lever having a vertically extending portion and an angulated portion engageable by a user's foot; b) spring means operable between the vertically extending portion of the foot lever and the angulated face of said angle iron to return the pivotable foot lever to a vertical, at rest position; c) means to secure the foot-operated lever assist mechanism to a dolly, the means to secure including means to engage the laterally extending axle of the dolly.

Preferably, the means to engage the laterally extending axle comprises at least one boss surrounding the axle. Another feature is that the pivotable foot lever is adjustable in length. This is made possible by a first piece secured to the hand truck and a second piece which telescopes with respect to said first piece and is secured in one of a plurality of positions to provide a plurality of lengths. In one embodiment, the spring means comprises a plurality of elastic bungee cords secured between the pivotable foot lever and a vertical leg of the hand truck.

In the preferred embodiment, a downwardly turned end portion extends from the angulated portion whereas a user's foot may engage beneath the downwardly turned end portion to extract a support platform thereof from beneath its load. An extension member is pivotally connected to a horizontally extending portion of the dolly. Most preferably, the extension member is telescopic allowing a length of the extension member to be adjusted. In one embodiment the extension member has recesses formed in an upper surface thereof to accommodate at least one beverage keg.

The foot-operated lever assist mechanism preferably includes brake means attached to the pivotable foot lever, the brake means including brake pads which engage at least one of a pair of wheels (and preferably, both wheels) of the hand truck when the pivotable foot lever is engaged by a user's foot. The foot-operated lever assist mechanism includes at least one rocker attached to the pivotable foot lever to facilitate climbing an impediment including a curb, a door jamb, and a stair.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2 is a front view of the first embodiment;

FIG. 3 is a cross-sectional side view of the first embodiment taken along line 3-3 in FIG. 2;

FIG. 4A is a front view of the spring mechanism of the foot lever;

FIG. 4B is a side view of the spring mechanism;

FIG. 10A is a side view of a fourth embodiment featuring an auxiliary base extension in a folded position;

FIG. 10B is a front view of the auxiliary base extension of the fourth embodiment;

FIG. 10C is a cross-sectional bottom view of the auxiliary base extension of the fourth embodiment taken along line 10C-10C in FIG. 10B;

FIG. 11A is a top view of a fifth embodiment featuring an alternative auxiliary extension;

FIG. 11B is a side view of the alternative extension shown in FIG. 11A in the extended position;

FIG. 11C is a side view of the FIG. 11A extension shown in a collapsed position;

FIG. 11D is a schematic side view showing the FIG. 11 extension loaded with two kegs;

FIG. 14A is a front view of a seventh embodiment featuring a brake assembly;

FIG. 14B is a side view of the seventh embodiment shown in FIG. 14A;

FIG. 14C is a top view of the seventh embodiment;

FIG. 16A is a front schematic of an eighth embodiment of the lever assist of the present invention;

FIG. 16B is a side schematic of the lever assist shown in FIG. 16A;

FIG. 16C is a top schematic of the eighth embodiment;

FIG. 17A is a side schematic depiction of a ninth embodiment employing a stair climber; and, FIG. 17B is a front view of the embodiment shown in FIG. 17A.

DETAILED DESCRIPTION OF THE PREFERRED EMBODIMENT(S)

Figure 1:
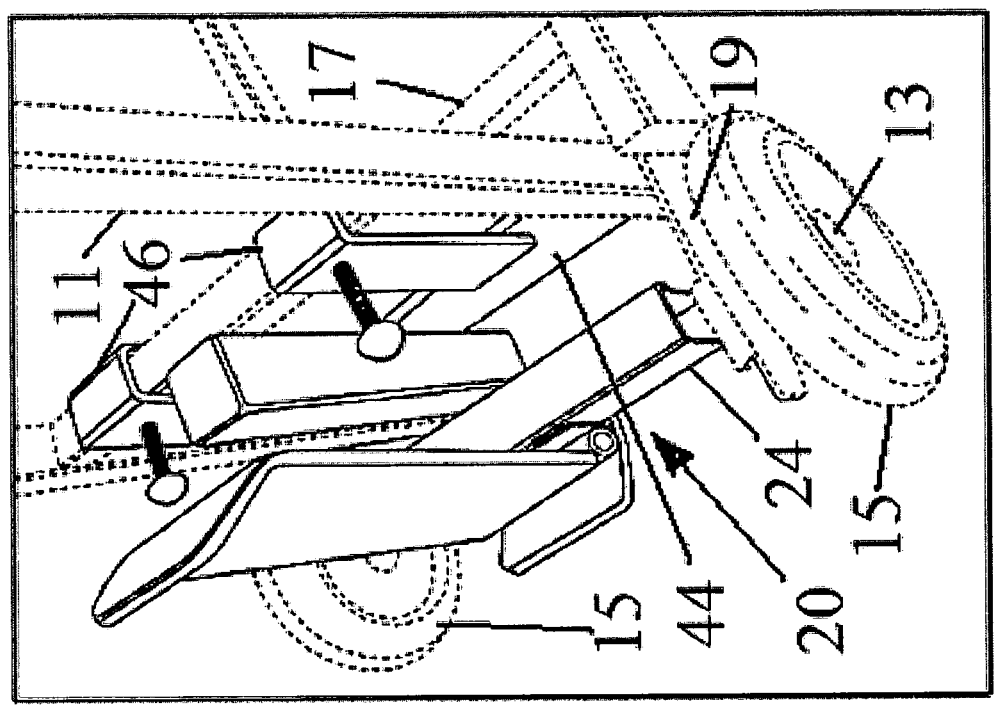
FIG. 1 is a rear perspective view of a first embodiment of the lever assist mechanism of the present invention.

A first embodiment of the foot-operated lever assist member of the present invention is depicted in FIGS. 1-3 generally at 20. Foot-operated lever assist member 20 is secured to a transport dolly/hand truck 11 which has a horizontal axle 13 which mounts a plurality of wheels 15, said plurality being most often, two. In the embodiment shown in FIGS. 1-7, longitudinal channel member 22 extends parallel to the axle 13 and has an element 24 (FIG. 3) for engaging the axle 13 transferring the load which the lever assist 20 experiences to the axle 13. Some other lever assist devices transfer the load to some skimpy metal strips. While this type of assembly may be suitable for the relatively light loads with which the mechanism in question is designed to be used, such a configuration would be entirely inadequate for the heavy-duty usage envisioned for the present invention.

A first leg 25 of angle iron 26 is welded to the bottom edge 23 of channel member 22. Second leg 25' forms an obtuse angle of around 135° with first leg 25. A pair of coil springs 28, wrapped around mounting pin 29, mount foot lever 30 to second leg 25' and bias it to an upright position where it is out of the transport dolly handler's leg-swing path. Other prior art foot levers which are fixed to extend toward the handler pose a significant risk for her/his shins. In addition, such foot levers make it virtually impossible to pull a loaded hand truck backwards up a series of steps. Foot lever 30 includes a first vertically extending portion 32 and a second rearwardly angled portion 34 which facilitates engagement by the handler's foot. Distal ends 28' of springs 28 extend through slots 31 in foot lever 30 as best seen in FIGS. 2 and 3. Attachment of angle iron 26 to the bottom edge 23 of channel member 22 is made somewhat more secure by intermediate member 27 being welded both to the bottom edge 23 as well as the rear surface 21 of channel 22 and the upper surface of angle iron 26.

The first embodiment of lever assist 20 depicted in FIGS. 1-7, is adapted to be transferred from dolly to dolly, as needed. Further, it is configured to be adjusted to fit various sizes of hand trucks. As best seen in FIGS. 1-3, lever assist 20 includes a vertical column 40 which has a channel 42 that opens toward the front. Bolt 45 extends into channel 42 with washer 43 engaging rolled rims 41a, 41b thereby attaching laterally extending plate 44 to vertical column 40, to which two hangars 46 are welded. Each hangar 46 has a thumb screw 48 which can be tightened on to a lateral support member 17 of dolly 11. A pair of stabilizer plates 50, 52 are adjustably held in place by bolt 47 and nut 49. By loosening the bolt/nut duo 47/49, stabilizer plates 50, 52 can be adjusted as indicated by arrows 12a, 12b sliding behind the rolled rims 26a, 26b in channel 22 to engage lateral walls 19 of dolly 11 (FIG. 1). Bolt 45 is adjustably secured in channel 42 to permit hangars 46 to be attached to lateral support 17 while element 24 sits atop axle 13. It will be understood that different styles of dollies will have varying distances between lateral support 17 and axle 13.

Figure 5:
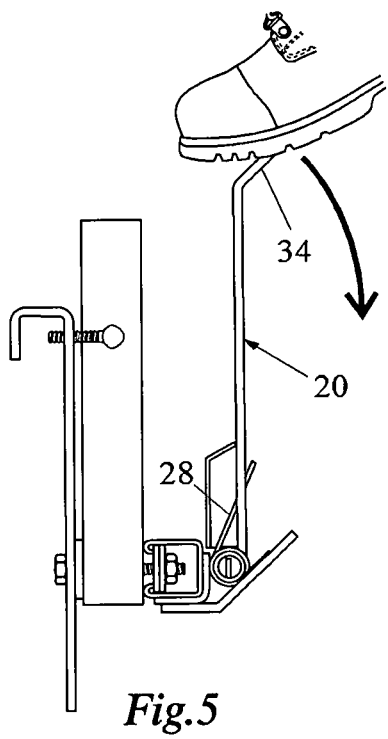
FIG. 5 is a schematic depiction of the initial engagement of the lever by the user's foot.
Figure 6:
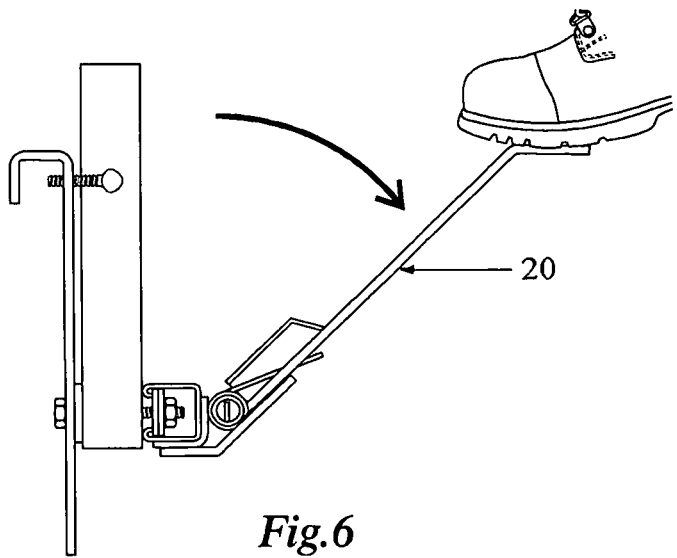
FIG. 6 is a schematic depiction of the spring being fully extended.
Figure 7:
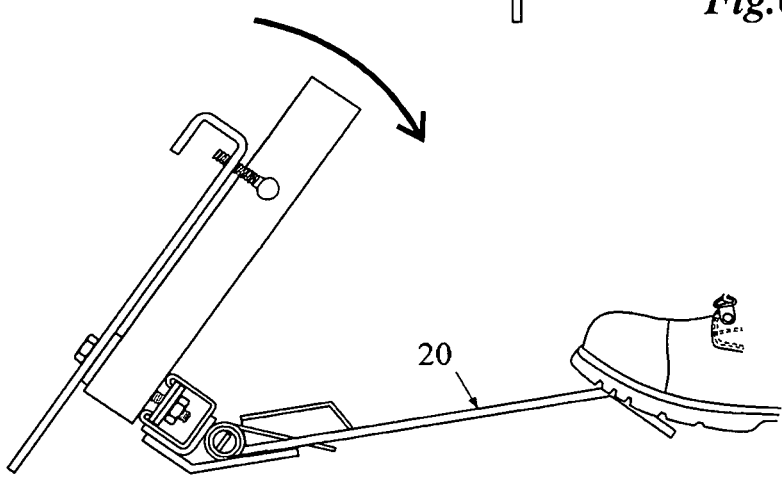
FIG. 7 is a schematic depiction of the foot lever having moved the load over the dolly's wheels.

The mode of operation of the lever assist 20 is depicted in conjunction with FIGS. 5-7. While engaging the handles of the dolly, the hand truck operator engages the rearwardly angled portion 34 with her/his foot, pressing downward against the bias of springs 28 bringing the previously vertically extending portion 32 or foot lever 30 into engagement with second leg 25' of angle iron 26 (FIG. 6). Additional pressure on the foot lever 30 causes the lever assist 20 and the dolly to which it is attached to rotate the load over the wheels for transport (FIG. 7). Tests indicate that by employing the lever assist 20 of the present invention with a dolly loaded with 18 cases of water, the user needed apply only 15 pounds of pressure to the handles, in addition to the weight supplied to the foot lever 30. This amounts to over a 90% reduction in pull force needed, greatly facilitating the movement of even the largest loads and, indeed, enables the operator to contemplate moving loads previously thought impossible to manipulate.

Figure 8:
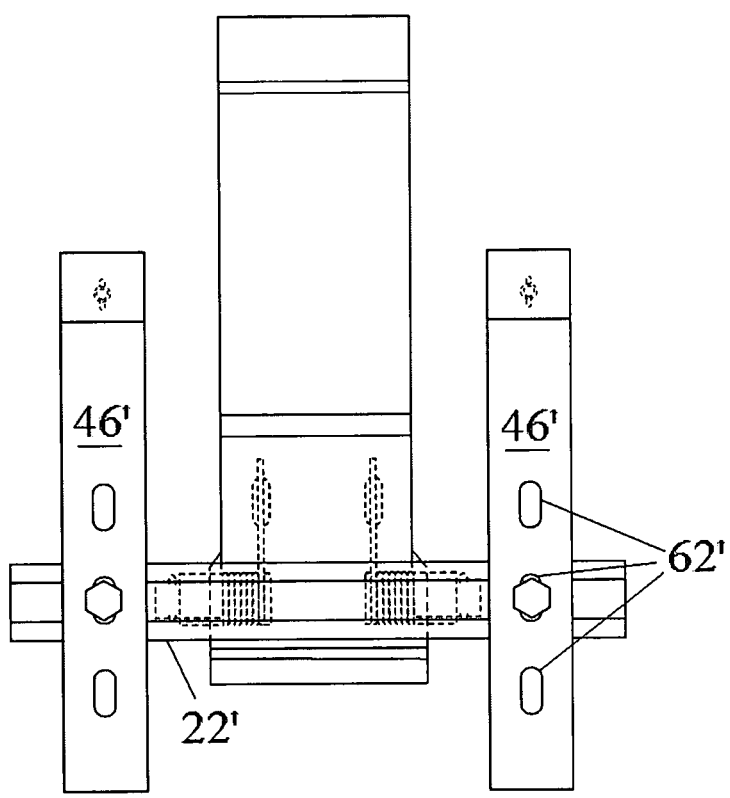
FIG. 8 is a front view of a second embodiment.
Figure 9:
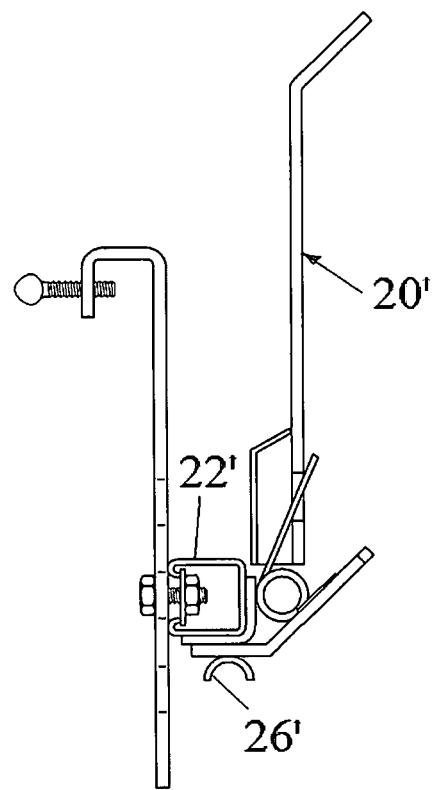
FIG. 9 is a side view of the second embodiment.

The second embodiment shown in FIGS. 8 and 9 eliminate the vertical column and simply attach the hangars 46' directly to lateral channel 22' using one of three throughbores 62', the positions of which will be chosen to accommodate the three most prevalent sizes of dollies. As depicted therein the thumb screws for hangars 46' may engage the lateral support of the dolly from the opposite side without departing from the scope of the invention.

Figure 10:
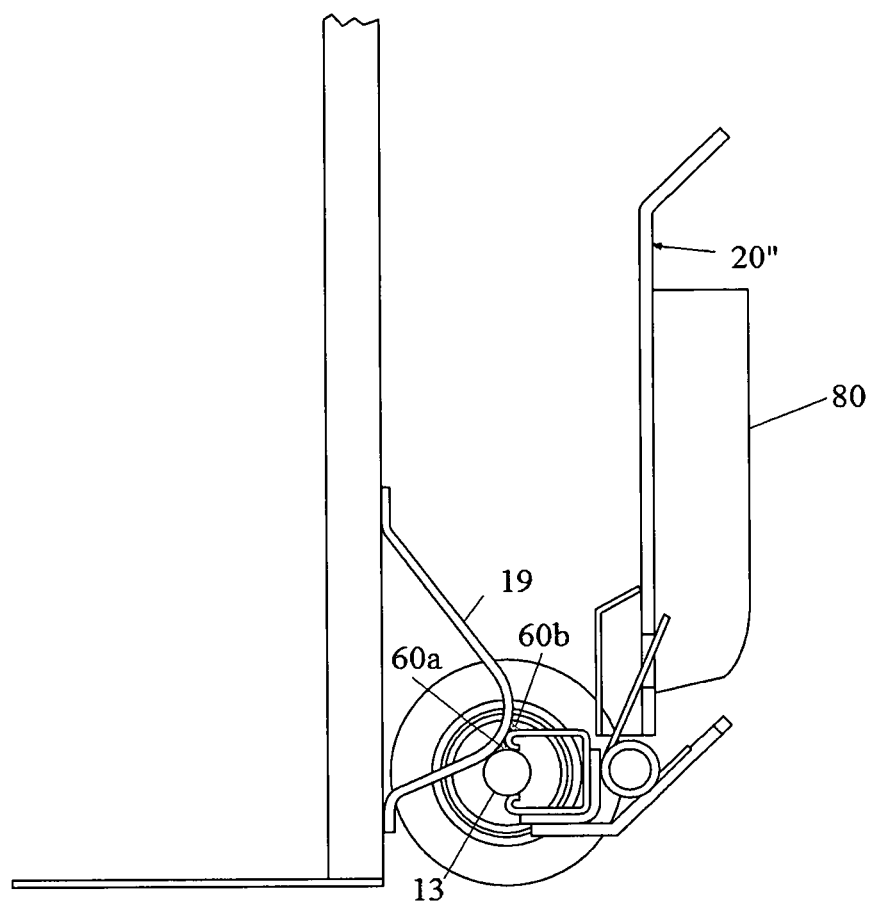
FIG. 10 is a side view of a third embodiment.

While these first two embodiments have been made as separate entities from the hand truck with which they are designed to be used, it is believed that once the value of the foot lever assist 20 of the present invention becomes apparent, users will want them permanently mounted on their hand trucks. Accordingly, the embodiment depicted in FIG. 10 shows the foot lever 20" welded at 60a and 60b to the axle 13 and the frame 19, respectively. Additionally depicted in FIG. 10 is a feature that may be incorporated in any of the embodiments detailed herein. A camming wedge 80 may be attached to the back side of the foot lever assist 20" allowing the loaded dolly to be cammed up a curb. The wedge 80 is preferably made of a self-lubricating plastic material such as HDPE to facilitate both sliding and lifting of the load. By placing a plurality of holes vertically situated on the inner edge of the wedge, additional camming material can be exposed along the bottom as the plastic is sacrificially worn off.

A fourth embodiment of the foot lever assist of the present invention is depicted in FIGS. 10A-10C generally at 20'''. A standard hand truck has a loadable foot of 8" in length. In this fourth embodiment an extended foot 16 of 18" is provided. This extended foot alone significantly amplifies the leverage afforded by the foot lever assist 20'. Extended foot 16 is secured to side walls 19. Extended foot 16 is provided with a pair of protruding ears 18 to which a telescoping extension 70''' may be pivotally attached. Ladder-like, telescoping extension 70''' may be pivoted from a vertical, collapsed idle position (FIG. 10A) to a horizontally extended loadable position. First section 72''' is pivotally secured to ears 18 while second section 74''' telescopes thereon (FIG. 10C). A pair of thumb screws 76''' are utilized to hold section 74''' in a desired position relative to section 72'''. While ladder-like extension may have whatever length desired, it is envisioned that when collapsed, extension 70''' would provide a loadable length of a bit more than 36" to provide room for the length of two cases or the width of three, and that fully extended, the extension would provide a surface that is 48" in length to accommodate four case widths which, of course, may be additionally stacked 4 cases (or more) high. The use of bungee cords or other securement means is recommended when attempting to move ultra large stacks of beverage cases. While the leverage afforded by the foot lever assist of the present invention will provide the handler with the capability to move large stacks, the handler will initially be advised to use caution until her/his ability to maneuver large stacks catches up to the capability s/he has been afforded by this device.

An added feature of the present invention is that the ladder-like extension 70''' can be painted pink to promote breast cancer awareness. As mentioned supra, the use of the "Clever Foot Lever" of the present invention will enable women to compete in a male dominated industry by providing them the mechanical advantage necessary for women to move these heavy loads.

A fifth embodiment featuring a second extension 170 is shown in FIGS. 11A-11D. As with the first extension, first section 172 is attached to the base of the hand truck and the second section 174 can extend (as shown in FIG. 11B) or retract (as shown in FIG. 11C) and pivot upwardly to form a compact package with the hand truck (not shown) for storage and transport or when not being utilized. As seen in FIG. 11D, two kegs 113 can be accommodated by the arcuate recesses 173A and 173B. It will be apparent that a third keg could readily be stacked atop kegs 113 by laying it coaxial with those kegs. The kegs of beer can be loaded onto the second extension 170 by rolling them onto the end or "horsing" (i.e., rocking them back and forth) them into position and laying them in place on the extension's recesses 173A and 173B. Accordingly, the workman does not have to lift the full weight of the kegs.

Figure 12B:
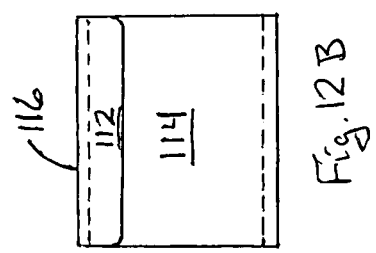
FIG. 12B is a front view of the foot bar and toe grab shown in FIG. 11A.
Figure 12A:
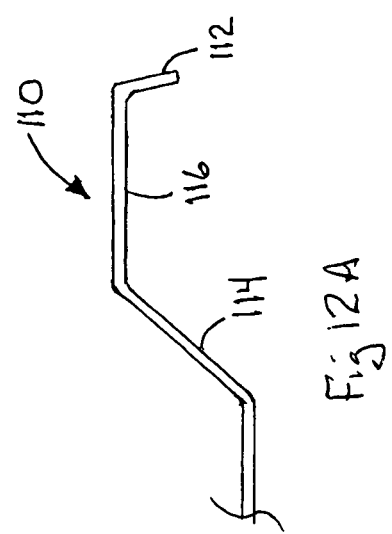
FIG. 12A is a partial side view of a foot bar and toe grab useful in conjunction with the lever assist of the present invention.

An additional feature known as the "toe grab" is shown at 110 in FIGS. 12A and 12B. When the cargo/stack of cases or boxes is to be unloaded from the hand truck, it is preferable that it not be necessary to unstack the cases and restack the cases, individually as this is tedious, backbreaking work. The standard support platform extends 9" and the case is typically 12" front to back leaving 3" extending beyond the support platform. By tilting the loaded hand truck forward with one hand and steading the stack with the other, the weight of the stack is shifted to the 3" of the bottom case extending beyond the platform. By sliding the toe of her/his boot beneath the downwardly angled extension 112 into engagement of the angled surface 114, the delivery truck operator can then exert upward pressure on the horizontal surface 116 hooking the extension 112 and slide the platform of the hand truck out from beneath the stack of cases pulling the stack to vertical using her/his steadying hand. This eliminates the tedious work of stacking/unstacking the load from the hand truck to the floor. The procedure can be reversed to load a stack of cases on the platform of the hand truck.

Figure 13:
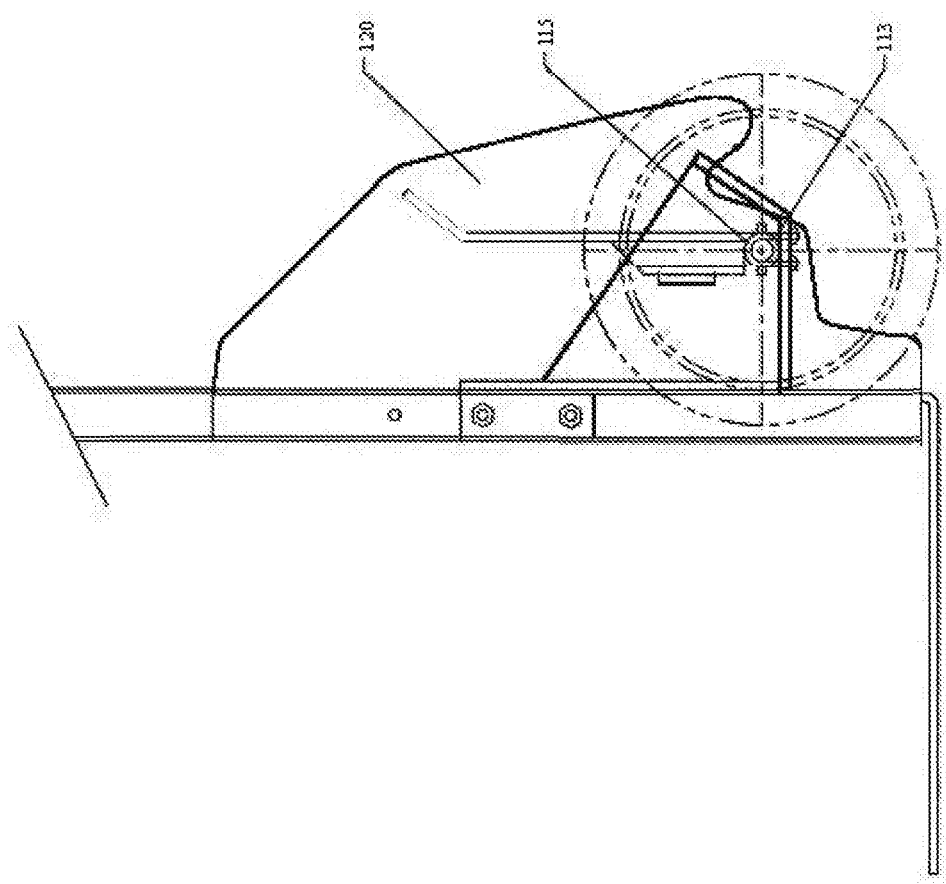
FIG. 13 is a side view of a sixth embodiment in which the lever assist pivots about the axle of the hand truck.

A sixth embodiment of the lever assist of the present invention is shown in FIG. 13 generally at 120. In this embodiment, the lever assist mechanism 120 is mounted directly on the axle 113 of hand truck 111. Axle 113 can be partially removed to permit its insertion through one or more bosses 115 of the lever assist 120. This embodiment reduces the redundancy of pieces and provides some mechanical advantage by operating directly off the existing axle 113. If the hand truck employs a split axle, installation of this embodiment is even easier.

A seventh embodiment featuring a brake assembly is shown in FIGS. 14A-14C generally at 120'. As the workman exerts a pulling force on the handle of the hand truck attempting to tilt the load rearwardly, the wheels of the hand truck may cause the entire load to move backward. This is counter-productive given that, typically, the desired direction of movement is forward. Accordingly, this seventh embodiment employs a brake assembly 132'. A split bar 132 has a first portion 132A with a brake pad 134A and a second portion 132B and a second brake pad 134B. Coupling 136 interconnects the two portions 132A and 132B of split bar 132. Linkage 138 connects the brake assembly 132' to foot lever 130' such that when the workman's foot engages the lever 130' to rock the load rearwardly, the brake pads 134A and 134B engage wheels 115A and 115B respectively preventing rearward movement allowing the center of the load to be transferred to a place over the wheels 115A and 115B. Once balanced is achieved, pressure on the foot lever 130' and brake assembly 132' is released and the loaded hand truck wheeled about in a conventional manner.

Figure 15A:
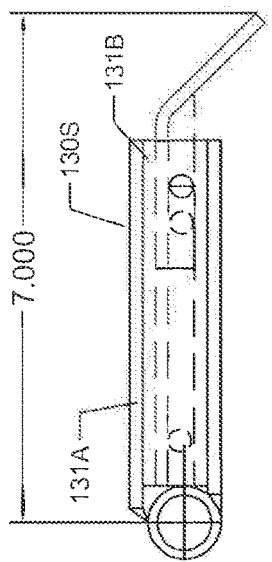
FIG. 15A is a side schematic of an adjustable foot lever shown in a first abbreviated position.
Figure 15B:
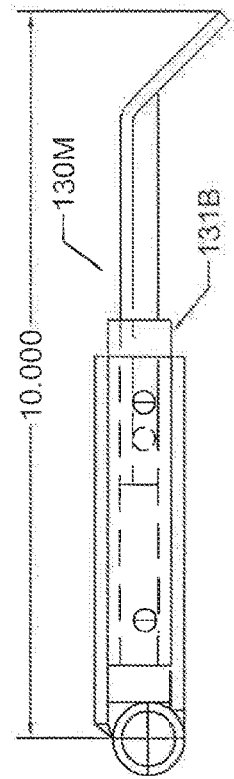
FIG. 15B is a side schematic of the adjustable foot lever shown in FIG. 15A in a mid position.
Figure 15C:
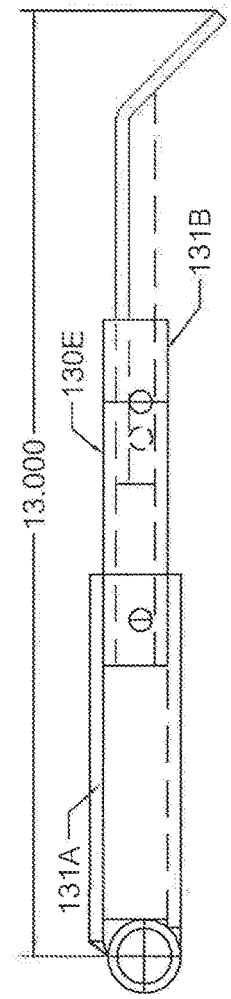
FIG. 15C is a side schematic of the FIG. 15A foot lever shown in its fully extended position.

Differing height workmen will find it more comfortable to have foot levers 130 which are of lengths that afford them maximum advantage in creating the tilting torque needed to reorient the load over the center of gravity of the hand truck. Accordingly, the adjustable foot lever of FIGS. 15A-15B is shown in three positions: 130s, 130m, and 130e, respectively, for short, medium and extended. Foot lever 130 is comprised of two telescoping pieces, a first piece 131A that can be secured to the axle of the hand truck or an auxiliary axle (as in the case of earlier embodiments), and a second telescoping piece 131B that can be slid between multiple positions and secured in place using one or more bolts.

While it is believed that the embodiments disclosed herein represent the best quality and operational features that can be developed, it is conceivable that less-costly versions could produce comparable results. FIGS. 16A-16C depict one such alternative. In this embodiment the torsion return spring utilized in the first embodiment is replaced by elastic bungee cords 142A and 142B extending between foot lever 130" and the vertical legs 19A and 19B, which return the foot lever 130" to vertical position when not engaged by the workman. Similarly, a weighted chain or strap could be employed to serve a like function.

FIGS. 17A and 17B depict a ninth embodiment 130" employing a stair climber. Frequently, a workman will need to navigate her/his loaded hand truck over a curb, door jamb or a series of steps to access her/his delivery point. This can be problematic enough when manipulating a normally loaded hand truck but the problem will be significantly exacerbated by the extra load the features of this invention make possible. A pair of rockers 150A and 150B along with caster 152, shown in FIGS. 17A and 17B will facilitate the climbing of impediments with a heavily loaded hand truck. In use, the eyelet 154 is secured to the axle of the hand truck. The hand truck will be maneuvered to permit the workman to proceed his cart up the step. Caster 152 will engage the front face of the step as the hand truck approaches. Rocker foot 156 will engage the upper surface of the step/impediment and allow rockers 150A and 150B to serve as pivot points and slides in "horsing" the loaded hand truck over the impediment. Rocker foot 156 may be made of a sacrificial material such as polyethylene, preferably HDPE, or polypropylene or Teflon.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A foot-operated lever assist mechanism for use on a dolly which has a laterally extending axle mounting a plurality of wheels, said mechanism comprising:
   a) a pivotable foot lever which comprises a first piece secured to the hand truck which forms a vertically extending portion and a second piece which telescopes with respect to said first piece and includes an angulated portion engageable by a user's foot said second piece being securable in one of a plurality of positions to said first piece using at least one bolt to provide a plurality of lengths to accommodate users of differing heights;
   b) spring means operable between said vertically extending portion of said foot lever and a fixed portion of the dolly to return said pivotable foot lever to a vertical, at rest position;
   c) means to secure said foot-operated lever assist mechanism to the dolly, said means to secure including means to engage the laterally extending axle of the dolly.

2. The foot-operated lever assist mechanism of claim 1 wherein said means to engage the laterally extending axle comprises at least one boss surrounding the axle.

3. The foot-operated lever assist mechanism of claim 1 wherein said spring means comprises a plurality of elastic bungee cords secured between said pivotable foot lever and a vertical leg of the hand truck.

4. The foot-operated lever assist mechanism of claim 1 further comprising a downwardly turned end portion extending from said angulated portion whereas a user's foot may engage beneath said downwardly turned end portion to extract a support platform thereof from beneath its load.

5. The foot-operated lever assist mechanism of claim 1 further comprising a telescopic load-supporting member pivotally connected to a horizontally extending portion of the dolly, whereby a length of said telescopic load-supporting member may be adjusted to accommodate various size loads.

6. The foot-operated lever assist mechanism of claim 5 wherein said telescopic load-supporting member has recesses formed in an upper surface thereof to accommodate at least one laterally extending beverage keg.

7. The foot-operated lever assist mechanism of claim 1 further comprising brake means attached to said pivotable foot lever, said brake means including brake pads which engage at least one of a pair of wheels of said hand truck when said pivotable foot lever is engaged by a user's foot to prevent pressure on said pivotable foot lever from inadvertently propelling the dolly forward.

8. The foot-operated lever assist mechanism of claim 1 further comprising at least one arcuately shaped rocker attached to said pivotable foot lever, said arcuately shaped rocker being itself pivotable to facilitate climbing an impediment including a curb, a door jamb, and a stair.

9. A foot-operated lever assist mechanism for use on a hand truck or dolly which has a horizontal axle mounting a plurality of wheels, said mechanism comprising:
   a) a pivotable foot lever attached to the hand truck having a vertically extending portion and an angulated portion engageable by a user's foot;
   b) spring means operable between said vertically extending portion of said foot lever and a portion of the hand truck to return said pivotable foot lever to an upright position when not engaged by the user's foot;
   c) brake means secured to said pivotable foot lever engagable with at least one of the plurality of wheels when said pivotable foot lever is engaged by the user's foot to inhibit rotational movement of the wheels when the hand truck is being reclined to prevent pressure on said pivotable foot lever from inadvertently propelling the dolly forward.

10. The foot-operated lever assist mechanism of claim 9 wherein said pivotable foot lever includes a first element pivotally attached to a horizontally extending portion of the dolly and a second member telescopically engaging said first member using at least one bolt enabling said pivotable foot lever to be adjusted to a plurality of lengths.

11. The foot-operated lever assist mechanism of claim 9 further comprising an arcuately shaped camming member attached to said foot-operated lever assist mechanism said arcuately shaped rocker being itself pivotable facilitating climbing of a curb with a fully loaded hand truck.

12. The foot-operated lever assist mechanism of claim 11 wherein said arcuately shaped camming member comprises a pair of pivotable rocker arms attached to lateral portions of said pivotable foot lever.

13. A foot-operated lever assist mechanism for use on a hand truck which has a horizontal axle mounting a plurality of wheels and a platform for supporting a load, said mechanism comprising:
   a) a pivotable foot lever attached to the hand truck having a vertically extending portion and an angulated portion engageable by a user's foot;
   b) spring means operable between said vertically extending portion of said foot lever and a portion of the hand truck to return said pivotable foot lever to an upright position when not engaged by the user's foot;
   c) a downwardly turned end portion extending from said angulated portion whereas a user's foot may engage beneath said downwardly turned portion to extract the support platform thereof from beneath its load.

14. The foot-operated lever assist mechanism of claim 13 further comprising brake means attached to said pivotable foot lever, said brake means including brake pads which engage at least one of a pair of wheels of said hand truck when said pivotable foot lever is engaged by a user's foot to prevent pressure on said pivotable foot lever from inadvertently propelling the dolly forward.

15. The foot-operated lever assist mechanism of claim 13 further comprising at least one arcuately shaped rocker attached to said pivotable foot lever said arcuately shaped rocker being itself pivotable to facilitate climbing an impediment including a curb, a door jamb, and a stair.

\* \* \* \* \*